United States Patent [19]
Howell

[11] 4,186,212
[45] Jan. 29, 1980

[54] ANIMAL FEED CONTAINING HIGH MOLECULAR WEIGHT ALIPHATIC ALCOHOLS

[76] Inventor: F. Maurice Howell, 5507 20th St., Lubbock, Tex. 79407

[21] Appl. No.: 884,764

[22] Filed: Mar. 9, 1978

[51] Int. Cl.² .................... A61K 31/045; A61K 31/01
[52] U.S. Cl. ..................................... 424/343; 424/355
[58] Field of Search ......................................... 424/343

[56] References Cited
U.S. PATENT DOCUMENTS 3,401,039  9/1968  Gordon et al. .................... 426/71

Primary Examiner—Sam Rosen
Attorney, Agent, or Firm—Jack N. Shears

[57] ABSTRACT

High molecular weight primary aliphatic alkanols are employed to enhance the energy content of animal basal diets. Alkanols having an even number of carbon atoms and having about 20 to about 32 carbon atoms per molecule are particularly advantageous to enhance the metabolic energy available in a ruminant diet.

6 Claims, No Drawings

ANIMAL FEED CONTAINING HIGH MOLECULAR WEIGHT ALIPHATIC ALCOHOLS

RELATED APPLICATION

This application is related to Application filed concurrently, entitled, "High Molecular Weight Alcohol Encapsulated Protein Biosynthesis Promoter".

BACKGROUND OF THE INVENTION

Field of the Invention

The invention relates to food compositions having enhanced energy content imparted by addition of a linear aliphatic primary alcohol, the alcohol having about 14 to 40 carbon atoms per molecule.

In one aspect, the invention relates to increasing the metabolic energy available in an animal basal diet by incorporating in the basal diet an aliphatic primary alcohol having in the range of about 14 to 40 carbon atoms per molecule.

An area of considerable interest in ruminant nutrition currently is the addition of a fat such as beef tallow to the basal diet. Numerous reports describe varying effects of fat addition to such rations. Irwin et al, J. Animal Sci. 15:710 (1956) and Bohman et al, J. Animal Sci. 16:833 (1957) indicated that fat improves steer performance when added to high-quality roughage rations. However, Irwin et al, J. Animal Sci. 15:710 (1956) and Bohman et al, J. Animal Sci 18:567 (1959) shows that such fat reduces performance of low-quality roughage rations. Other researchers have concluded that such fat lowers the digestibility of dry matter, crude protein, and crude fiber. Others have found that fat depresses rate of gain in feedlot cattle. Still others have reported nonsignificant increases. Yet others have indicated that tallow was beneficial during in vitro fermentation studies. Nearly all the literature studied showed that fat additional resulted in increased energy.

The effect of beef tallow upon digestibility of ration components has been studied by several researchers, but few have reported actual digestion coefficients for beef tallow. Digestibility of beef tallow of 85 percent has been reported in sheep trials. The 85 percent value was stated to be comparable to similar estimates for pigs. Others have reported a value of 93 percent digestibility for beef tallow using ether extract, but a value of 85 percent was obtained from these data when the digestibility of energy in tallow is calculated. Such data indicate that if the gross energy of fat (assumed to be 9.4 kcal/g) is multiplied by the digestion coefficient of 85 percent, then a digestible energy value of 8.0 kcal/g is obtained.

As is well known to those skilled in the art, such fats are chemically triesters of glycerin and long-chain aliphatic carboxylic acids.

McCarthy, Biochin. Biophys. Acta, 84, 74–79 (1964) reports a very small but detectable metabolism of straight-chain saturated hydrocarbons in the $C_{16}$–$C_{18}$ range by mammals.

Carbohydrates are well-known sources of energy for a large number of animal species. Such materials include important energy sources such as starches, sucrose, glucose, and the like. Such carbohydrates are polyhydroxy materials.

U.S. Pat. No. 3,421,898 discloses that the growth of ruminants is stimulated by feeding such ruminants a feed composition containing an ethoxylated alcohol. However, it should be noted that such compositions have a hydroxy group on a polyether chain, and are not alkanols as in the instant invention.

U.S. Pat. No. 3,791,241 discloses that metabolic energy sources in food are increased by incorporating linear aliphatic polyols. Again, it should be noted that polyols are not the high molecular weight aliphatic alkanols of the instant invention, but in fact are more similar to polyols such as sucrose and glucose to which they are compared in the patent.

U.S. Pat. No. 3,410,690 discloses a liquid feed supplement for addition to the drinking water of poultry comprising an emulsion of a syrup, water, and fat; with the syrup being a mixture of emulsifiers, water, and an edible alcohol. The alcohol disclosed therein is apparently ethanol, which is a well-known source of metabolic energy. No suggestion is made that the higher alcohols contemplated by the instant invention would be a suitable, and in fact, such alcohols would not be expected by those skilled in the art to have the effect called for by that patent, that is, enhancing the preparation of the emulsions. Neither would low molecular weight odd-number alcohols such as methanol be suitable because of toxicity.

U.S. Pat. No. 3,723,130 discloses effectiveness for improving animal acceptance of feeds of compounds such as oleyl alcohol. However, it should be noted that oleyl alcohol is an unsaturated compound having a double bond and is not similar to the aliphatic alkanols of the instant invention.

U.S. Pat. No. Re. 28,691 discloses that certain tertiary alcohols and certain of their derivatives cause animals to eat past the point of satiety and thus gain weight at a faster rate than normal. It should be noted that such alcohols are not closely related to the alkanols of the instant invention, that the effect is apparently pharmacological, and that no indication is given that such tertiary alcohols contribute to the metabolizable energy content of the diet.

U.S. Pat. No. 3,031,376 purports that extremely small amounts of a high molecular weight primary aliphatic alcohol such as 1-octacosanol, 1-tricontanol, 1-hexacosanol, and 1-tetracosanol are physiologically active to increase oxygen utilization, improve physical endurance, reduce fatigue, and enhance the sexual characteristics of humans. However, it should be noted that the amounts involved are very small compared to the quantities called for by the instant invention, i.e., 0.05 milligrams to 150 milligrams per day for a human. No disclosure is made of enhancement of the energy content of the basal diet involved, nor would a substantial effect be expected, even from hindsight, in view of the quantities involved.

OBJECTS OF THE INVENTION

An object of the invention is to provide food compositions having enhanced energy content.

Another object of the invention is to provide a method for increasing the metabolic energy available in an animal basal diet.

SUMMARY OF THE INVENTION

A food composition having enhanced energy content comprises a basal animal diet containing sufficient protein, salts, vitamins, and minerals to support normal growth and from 0.5 to 20 percent on a dry weight basis of a linear aliphatic primary alcohol, the alcohol having in the range of about 14 to 40 carbon atoms per molecule.

The metabolic energy available in an animal basal diet is increased by incorporating in the basal diet about 0.5 to about 20 percent on a dry weight basis of an aliphatic primary alcohol.

PREFERRED EMBODIMENTS OF THE INVENTION

The food composition which is provided according to the invention comprises a basal animal diet plus sufficient linear aliphatic primary alcohol to enhance the energy content thereof.

Such animal diets can be any conventional animal diet, and according to one presently preferred mode, the animal diet is a composition suitable for a ruminant feed.

Of course, the basal animal diet which is enhanced should be one which is suitable for the particular animal species to which it will be fed. For example, a high roughage composition suitable for ruminant feed can include cellulosic roughage components such as straw, extracted sugar cane (bagasse), by-products from wood processing (cellulosic), by-products from cotton processing, hay, cottonseed hulls, silages, corn stalks, oats, barley, cereal brans, and the like. Other components such as grain or grain products can be present. Suitable sources of vitamins and minerals should be present. Suitable protein content or suitable protein precursors are also needed.

Such basal animal diets are well-known to those skilled in the art for each species of animal, particularly those of commercial importance such as cattle and swine.

The aliphatic alkanol which is added to the basal animal diet should be in amounts sufficient to provide a significant amount of increased energy content when the animal metabolizes the diet. Normally, about 0.5 to about 20 percent (on a dry weight basis) of the linear aliphatic primary alkanol per total weight of the diet is suitable.

The linear aliphatic alkanol which is employed according to this invention is represented by the following formula:

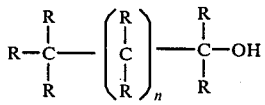

wherein R is hydrogen or an aliphatic hydrocarbyl radical and wherein n is an integer from about 6 to about 38. Suitable alcohols have in the range of about 14 to about 40 carbon atoms per molecule. Preferred alcohols have in the range of about 20 to about 32 carbon atoms per molecule. Even more preferred alcohols are 1-alkanols wherein n is an integer in the range of 18 to 30 which have an even number of carbon atoms and wherein R is hydrogen.

Such alcohols are readily available from a number of commercial sources. For example, such alcohols can be obtained by the well-known oxo reaction on alkenes of suitable chain length. A particularly suitable source of such alcohols is the hydrolysis product of an ethylene growth reaction product on an aluminum trialkyl.

Suitable alcohols are readily available in large amounts from a number of sources, including the Ethyl Corporation, Continental Oil Company, and other suppliers.

One high molecular weight primary aliphatic alcohol product which is suitable for use according to this invention is EPAL TM 20+ alcohol. This product is a blend of linear and branched alcohols with carbon numbers ranging from $C_{20}$ to $C_{32}$ and of hydrocarbons with carbon numbers ranging from $C_{24}$ through $C_{40}$. The product is an off-white, soft, waxy solid congealing between 110° F. and 122° F. The product is very much like a natural fat or oil in appearance.

It has a hydroxyl value of 105 mgKOH/g; an acid value of 0.1 mgKOH/g; an ester value of 2 mgKOH/g; an iodine value of 6 $CgI_2/g$; and a carbonyl oxygen content of 0.1 weight percent O. It has a congealing point of 115° F. (ASTMD 938/70), a color of 300 APHA; a color of 3.5 Gardner (ASTMD 1544-68); a flash point of greater than 400° F. (open cup method) and is an off-white waxy solid. It has 4 weight percent $C_{18}OH$; 20 weight percent $C_{20}OH$; 13 weight percent $C_{22}OH$; 10 weight percent $C_{24}OH$; 8 weight percent $C_{26}OH$; 5 weight percent $C_{28}OH$; 3 weight percent $C_{30}OH$; and 3 weight percent $C_{32}OH$ and higher for a total of 66 weight percent normal and branched alcohols. About 30 weight percent is normal alcohols and about 30 weight percent is branched alcohols. The product also has about 34 weight percent of $C_{24}$ to $C_{40}$ aliphatic hydrocarbons. The product is available from the Ethyl Corporation, Baton Rouge, LA 70821.

Other suitable products are Alfol TM 20+ or 22+ alcohols available from Continental Oil Company. These two products are off-white, solid products containing $C_{20}$–$C_{28}$ linear primary alcohols. The homolog distribution is different in each of the products.

Such aliphatic alcohols can be incorporated into the basal animal diet in any of a number of ways. For example, a particulate component of the feed can have a molten alcohol mixture sprayed thereupon, the coated particles can be allowed to cool, and the thus treated component can be admixed with the rest of the diet. For another example, the aliphatic alcohol can be dissolved in a suitable solvent, the dissolved can be applied to the basal animal feed, as by spraying thereupon, and then the solvent can be vaporized, leaving the basal animal diet having the aliphatic alcohol well dispersed thereupon. According to yet another example, a molten mixture of the alcohol can be injected into a blender wherein solid components of the basal animal diet are mixed while the molten mixture is injected. An excellent dispersion of the alcohol within the other diet components is thereby obtained.

The invention is further disclosed and exemplified to those skilled in the art by the following examples. However, It is to be understood that such examples shall not constitute limitations on the scope of the invention as disclosed and claimed.

Experiments were designed to determine the apparent digestibility and nitrogen balance values for a cattle feedlot finishing ration containing 5 percent of EPAL TM 20+ alkanols, heretofore described, as compared to a similar ration without the high molecular weight synthetic primary aliphatic alkanols and to determine the digestibility of the $C_{20+}$ primary aliphatic alkanols.

Experiment 1: An in vitro digestibility study was conducted to determine the digestibility of the alkanols as compared to beef tallow. The procedure was conducted according to the one described by Van Soest in which the test materials and rumen fluid were incubated for 48 hours to determine the in vitro digestibility of each material. Two runs were conducted; the first without a carrier for the tallow and alcohols, but with a reference forage as a carrier in the second trial.

Experiment 2: Eight holstein steers were divided into 4 groups of 2 each and weighed after a 14-hour shrink (off feed and water). Each pair of steers was placed in a pen, and fed together in 2 feedings, morning and evening, for a period of 18 days, which was considered to be a period suitable for determination of growth and feedlot performance, as well as serving as a preliminary adjustment period for the digestion trial of Experiment 3. The steers were allowed access to water, through choice. The steers were placed on feed by restricting intake initially and then increasing the amount of feed per head daily up to a constant 20 pounds, divided into 2 feedings. Two pens of 2 steers each were placed on the control ration, and the 2 pens of 2 steers each were placed on the experimental ration containing 5 percent alkanols. The physical and chemical composition of these rations are shown in Tables 1 and 2, respectively. After the 18-day adjustment period, the cattle were shrunk overnight, again for 14 hours, and weighed early in the morning, prior to placing in stalls for the total collection trial.

Experiment 3: The 18-day preliminary adjustment period of the steers was followed by a 5-day adjustment period in the stalls and then a 7-day total collection of feces and urine. The rations were offered to each animal morning and evening at the rate of 10 pounds per head. Urine and fecal collections were made throughout the day, and then in the evening of each of the last 7 days. The feces and urine were weighed, sampled, and stored in a refrigerator for composite analysis. Ten percent of the feces and 10 percent of the urine were taken from each day's collection. Hydrochloric acid was used to acidify the urine during the collection. Each daily collection was composited in the same container, so that at the end of 7 days, there were 8 containers of feces, 8 jars of urine, and two containers of ration samples. The contents of each of these containers were thoroughly mixed and aliquotes of feces, urine, and rations were taken to the laboratory for chemical analysis. Urine samples were frozen. The wet feces were divided into 3 samples; one sample was air-dried immediately for dry-matter determination, a second sample was used for crude protein analysis on wet basis, and a third larger sample was dried for later laboratory analyses. The feed and dried fecal samples were ground through a 10-mesh screen in a Wiley mill and then taken to the laboratory for chemical analyses. Chemical analyses were conducted as follows: Feeds and dry feces were analyzed for dry matter, crude protein, ash, and gross energy; wet feces were analyzed for dry matter and crude protein, urine samples were thawed and analyzed for crude protein and gross energy. Dry matter, crude protein and ash were determined according to A.O.A.C. standard procedures. Gross energy was determined using a Parr adiabatic bomb calorimeter.

Data from the collection trial, which involved weights of feces and feeds and volumes of urine in the laboratory analytical data, were used to calculate digestion coefficients for dry matter, organic matter, crude protein, and gross energy. Nitrogen retention values were also determined. The data were then subjected to statistical analyses according to the procedures of Steele and Torrie.

RESULTS AND DISCUSSIONS

Experiment 1: Results of Experiment 1 are shown in Table 3. The data in Table 3, indicate near zero digestibility of the alkanols when incubated with rumen microorganisms for 48 hours. In comparison, beef tallow values were also low, as would be expected.

Experiment 2: Results of Experiment 2 are shown in Table 4, in which the 18-day growing and adjustment period data are presented. One steer in the control groups went off feed after about 5 days, and intermittently was on and off feed for the next 5 days. Therefore, the data are presented with one steer out, and using only 50 percent of the feed fed to the 2 steers in that pen. These results indicate that steers consuming 5 percent alkanols utilized feed 7.6 percent more efficiently than the control steers. Daily gains were subjected to statistical analysis and mean differences were not significant at the 5 percent probability level.

Experiment 3: Results of the digestion and metabolism trial are shown in Table 5. No significant differences ($P>0.05$) were detected between treatments for the parameters shown. One steer receiving each ration was removed from the experiment due to irregular activities, which resulted in restricted degrees of freedom for statistical analyses. However, a trend was detected for significance ($P<0.10$) between treatment means for digestible energy, favoring the ration containing 5 percent alkanols.

Digestibility of the Alkanol: The digestibility of synthetic alkanols was determined by the difference method, using 95 percent of the energy values for the 0 percent fatty alcohol ration and 5 percent allowed for the $C_{20+}$ alkanols. The digestibility of $C_{20+}$ alcohols was estimated to be 73 percent. The gross energy of $C_{20+}$ alcohols was determined to be 10.43 kcal/g. If the gross energy (10.43 kcal/g) is multiplied by the digestion coefficient of 73 percent, then a digestible energy value of 7.6 kcal/g for $C_{20+}$ alcohols is obtained. If a gross energy value of 9.4 kcal/g and a digestion coefficient of 85 percent is selected for fat, tallow, vegetable source or blend, for purposes of illustration, then a digestible energy value for fat, in the example, would be 8.0 kcal/g. Dividing the fat example value of 8.0 kcal/g into the fatty alcohol value of 7.6 and multiplying by 100, then the alcohols would yield over 95 percent of the digestible energy per unit weight of fat.

Metabolizable Energy: The average daily urinary excretion of gross energy was not significantly different ($P>0.05$) between treatments; 1,287 kcal/day/steer consuming the control ration and 1,061 kcal/day/steer consuming the 5 percent alcohol ration. To determine the metabolizable energy content of the alcohols, the digestible energy value of 7.6 kcal/g is multiplied by 0.82 to give 6.2 kcal/g metabolizable energy.

GENERAL OBSERVATIONS

1. The 2 steers removed from data calculations resulted from one steer consuming the control ration developing chronic acidosis, lacking appetite, alertness and constantly refusing to consume allotted quantities of feed. The steer consuming the alcohol ration would not consistently stand in the stall, but would step out of the stall into the fecal collection tray, then some of the feces would drop from the hooves into the urine tray when he stepped back into the stall, not permitting accurate collections of feces and urine.

2. Steers offered the 5 percent alcohol ration vigorously consumed their alotted quantities within approximately 15 minutes, whereas steers consuming the ration without alcohols consistently used more than 30 minutes to consume each feeding.

3. The 5 percent alcohol ration exhibited a "fat-containing" texture, both visually and to touch. Dustiness observed in the control ration was eliminated.

4. Visual observation of samples of the dry, ground rations and feces revealed that both feed and fecal samples from the 5 percent alcohol treatment were slightly darker in color than the control ration and resultant feces.

5. The synthetic alcohols are not ether-extractable.

6. A demonstration test was conducted by placing 2 grams of synthetic alcohols and 2 grams of beef tallow in separate, duplicate, Petri dishes with 10 ml of fresh bile obtained from a local packing plant. Visual observations were made by 2 technicians at 15-minute intervals. After 45 minutes, some discloration was observed in each dish, which appeared to be similar for the 2 materials. These observations suggest that the materials were being emulsified by the bile.

7. Nutrient protection from rumen degradation was attempted in this study by blending the soybean meal and l-lysine with the alcohols prior to mixing the total ration (refer to footnote of Table 1). Indication that nutrient protection was obtained is the higher, non-significant (P>0.05) digestion coefficient for crude protein in the 5 percent alcohol treatment. Large steers (338 kilograms) were selected for testing the digestibility of the alcohols, but smaller animals would have been more desirable for detecting possible differences in nitrogen retention due to rumen bypass.

TABLE 1.

PHYSICAL COMPOSITION OF RATIONS FOR ALKANOL DIGESTION TRIAL (%, as fed)

| Ingredients | Rations | |
|---|---|---|
| | 0% Alkanol | 5% Alkanol |
| Milo, dry-rolled | 82.9 | 78.8 |
| Cottonseed hulls | 11.6 | 11.0 |
| Soybean meal | 4.5 | 4.28 |
| Limestone | 0.4 | 0.38 |
| Salt | 0.5 | 0.48 |
| Vitamin A30 | 11.7 g | 11.7 g |
| L-lysine | 50 g | 50 g |
| Fatty alcohol[a] | — | 5.0 |
| | 100 | 100 |

[a]The alkanol was melted and blended with the soybean meal and l-lysine as a premix before placing into the large mixer containing the remainder of the ration ingredients.

TABLE 2.

CHEMICAL COMPOSITION OF RATIONS FOR ALKANOL DIGESTION TRIAL (dry matter basis)

| Item[a] | Rations | |
|---|---|---|
| | 0% Alkanol | 5% Alkanol |
| Dry matter, % | 90.29 | 90.87 |
| Crude protein, % | 12.3 | 11.4 |
| Ash, % | 3.08 | 2.23 |
| Calcium, % | .51 | .45 |
| Phosphorus, % | .37 | .33 |
| Gross energy, kcal/g | 4.37 | 4.70 |

[a]Gross energy content of the alkanols was 10.43 kcal/g (dry matter basis) with a dry matter content of 99.88%.

TABLE 3.

IN VITRO DRY MATTER DIGESTIBILITY OF BEEF TALLOW AND ALKANOLS

| Item | Beef Tallow | Source of Alkanols | |
|---|---|---|---|
| | | A | E |
| Dry matter, % | 99.66 | 99.85 | 99.88 |
| In vitro digestibility | | | |
| Trial I[a] | | | |
| Dry matter, % | 12.1 | 0.4 | 3.2 |
| Trial II[b] | | | |
| Dry matter, % | 6.9 | 0 | 0 |

[a]Fermented with no reference material.
[b]Determined by difference when fermented with reference forage at 5.5% dry matter digestibility.

TABLE 4.

FEEDLOT PERFORMANCE OF STEERS DURING THE 18-DAY ADJUSTMENT PERIOD PRIOR TO THE TOTAL COLLCTION TRIAL (lb).

| Item[a] | Rations | | Standard Error |
|---|---|---|---|
| | 0% Alkanol | 5% Alkanol | |
| No. of steers | 3[b] | 4 | — |
| Total gain[c] | 116 | 165 | — |
| Total feed consumed | 1,067[d] | 1,408 | — |
| Average daily gain | 2.1 | 2.3 | .7 |
| Average daily feed consumed | 19.8 | 19.6 | — |
| Efficiency (feed/gain) | 9.2 | 8.5 | — |

[a]Non-significant difference between treatments (P>.05).
[b]One steer removed due to irregular feed consumption.
[c]Live weights were recorded in the morning following a shrink of 14 hours off feed and water. Mean weights for the 0% alkaol fed steers were 351 kilorams and 342 kilograms for steers on the 5% alkanol treatment.
[d]Adjusted for steer removed.

TABLE 5.

DIGESTION COEFFICIENTS AND NITROGEN RETENTION VALUES FOR THE ALKANOL DIGESTION AND METABOLISM TRIAL

| Item[a] | Rations | | Standrad Error |
|---|---|---|---|
| | 0% Alkanol | 5% Alkanol | |
| Number of steers | 3 | 3 | |
| Digestion coefficients, %[a] | | | |
| Dry matter | 60.73 | 60.34 | 1.7 |
| Organic matter | 61.58 | 61.75 | 1.7 |
| Crude protein | 46.60 | 49.19 | 2.9 |
| Gross energy | 60.90 | 61.99 | 1.6 |
| Nitrogen retention[a] | | | |
| g/day | 32.0 | 31.4 | 7.1 |
| % of intake | 22.9 | 23.1 | 5.3 |
| Nitrogen excretion/day[a] | | | |
| Feces, g | 74.9 | 69.1 | 4.3 |
| Urine, g | 33.3 | 35.5 | 4.1 |
| Digestible energy, kcal/g[b] | 2.66 | 2.91 | .07 |

[a]Non-significant difference between treatments (P>.05).
[b]Approached significant mean difference (P>.10).

I claim:

1. A food composition having enhanced energy content comprising a basal animal diet containing sufficient protein, salts, vitamins, and minerals to support normal growth and from 0.5 to 20 percent on a dry weight basis of a linear aliphatic synthetic alkanol, said alkanol having about 20 to about 32 carbon atoms per molecule, wherein the alkanol has an even number of carbon atoms, is synthetically derived, and is supplied to the food composition as an unseparated part of hydrolysis product of an ethylene reaction growth product on an aluminum trialkyl, the hydrolysis product comprising a blend of said linear aliphatic primary synthetic alkanol plus branched alcohols having carbon atoms ranging from $C_{20}$ to $C_{32}$, wherein about half of the weight of the alcohol components of the product are branched, and wherein about one-third of the product weight is comprised of aliphatic hydrocarbons having about 24 to about 40 carbon atoms per molecule.

2. The enhanced energy food composition of claim 1 wherein the components of the basal animal diet other than the hydrolysis product comprise a high roughage composition suitable for a ruminant feed.

3. The enhanced energy food composition of claim 2 wherein the basal diet component is suitable for nutrition of cattle and wherein the roughage component comprises straw, bagasse, cellulose products derived from wood, cellulose products from cotton, cottonseed hulls, silage, corn stalks, or roughage fractions processed from grain.

4. A method of increasing the metabolic energy available in an animal basal diet comprising incorporating in the basal diet about 0.5 to 20 percent on a dry weight basis of an aliphatic primary synthetic alkanol having about 20 to 32 carbon atoms per molecule wherein the alkanol has an even number of carbon atoms, is synthetically derived, and is incorporated in the food composition as an unseparated part of a hydrolysis product of an ethylene growth reaction product on an aluminum trialkyl, the hydrolysis product comprising a blend of the aliphatic primary synthetic alkanol plus branched alcohols with carbon atoms ranging from $C_{20}$ to $C_{32}$, about half of the weight of the alcohol components of the hydrolysis product being branched, and about one-third of the product weight being comprised of $C_{24}$ to $C_{40}$ aliphatic hydrocarbons.

5. The method of claim 4 wherein the animal basal diet is a ruminant diet, wherein the metabolic energy available from the ruminant diet is enhanced, and wherein the ruminant diet is a high roughage diet suitable for feeding to cattle.

6. The method of claim 5 wherein the high roughage diet contains a roughage element selected from straw, bagasse, corn stalks, hay, sorghum stalks, or other cellulosic material.

* * * * *